(12) United States Patent
Sekizawa et al.

(10) Patent No.: US 8,358,329 B2
(45) Date of Patent: Jan. 22, 2013

(54) STEREO IMAGE REPRODUCING APPARATUS, STEREO IMAGE REPRODUCTION METHOD, STEREO IMAGE REPRODUCTION PROGRAM, AND RECORDING MEDIUM HAVING SUCH PROGRAM RECORDED THEREIN

(75) Inventors: Hidehiko Sekizawa, Tokyo (JP); Ken Mashitani, Osaka (JP); Hideaki Yoshida, Tokyo (JP); Tadashi Uchiumi, Chiba (JP)

(73) Assignees: Sony Corporation, Tokyo (JP); Sanyo Electric Co., Ltd., Osaka (JP); Olympus Imaging Corporation, Tokyo (JP); Sharp Kabushiki Kaisha, Osaka (JP)

( * ) Notice: Subject to any disclaimer, the term of this patent is extended or adjusted under 35 U.S.C. 154(b) by 1368 days.

(21) Appl. No.: 11/922,901

(22) PCT Filed: Jun. 29, 2006

(86) PCT No.: PCT/JP2006/313023
§ 371 (c)(1),
(2), (4) Date: Dec. 21, 2007

(87) PCT Pub. No.: WO2007/001055
PCT Pub. Date: Jan. 4, 2007

(65) Prior Publication Data
US 2009/0091612 A1 Apr. 9, 2009

(30) Foreign Application Priority Data
Jun. 29, 2005 (JP) ................................. 2005-189434

(51) Int. Cl.
*H04N 7/00* (2011.01)
*H04N 7/12* (2006.01)

(52) U.S. Cl. ....................................... 348/36; 348/430.1
(58) Field of Classification Search .................... 348/36, 348/4, 430
See application file for complete search history.

(56) References Cited

U.S. PATENT DOCUMENTS
6,108,005 A * 8/2000 Starks et al. .................. 345/419
(Continued)

FOREIGN PATENT DOCUMENTS
JP 05-030538 2/1993
JP 09-160143 6/1997
(Continued)

OTHER PUBLICATIONS
U.S. Appl. No. 11/473,776, filed Jun. 23, 2006, Hidehiko Sekizawa.
(Continued)

*Primary Examiner* — Minh-Chau Nguyen
(74) *Attorney, Agent, or Firm* — Robert J. Depke; Rockey, Depke & Lyons, LLC

(57) ABSTRACT

The present invention is directed to a stereo image processing apparatus adapted for performing stereoscopic reproduction of images without depending upon header information of file to have ability to recover or restore header information for stereoscopic display which has been broken or missing, which includes an image input unit (1) for inputting plural main images constituting stereo images, a stereo information encoding unit (6) for encoding stereo information for stereoscopic display control with respect to the inputted plural main images into an image like bar code, and an image synthesis unit (8) for synthesizing the inputted plural main images and an encoded image of the stereo information in the state where corresponding areas for respective images are partitioned.

7 Claims, 11 Drawing Sheets

U.S. PATENT DOCUMENTS

| | | | |
|---|---|---|---|
| 6,161,114 A | 12/2000 | King et al. | |
| 6,222,947 B1 | 4/2001 | Koba | |
| 6,377,625 B1 * | 4/2002 | Kim | 375/240.08 |
| 6,631,205 B1 * | 10/2003 | Melen et al. | 382/154 |
| 6,765,568 B2 | 7/2004 | Swift et al. | |
| 6,944,328 B2 | 9/2005 | Yoshida | |
| 7,064,754 B2 * | 6/2006 | Iizuka et al. | 345/419 |
| 7,181,061 B2 | 2/2007 | Kawano et al. | |
| 7,679,616 B2 | 3/2010 | Nomura et al. | |
| 7,734,085 B2 | 6/2010 | Nomura et al. | |
| 7,791,640 B2 | 9/2010 | Yoshida | |
| 7,804,995 B2 | 9/2010 | Lipton et al. | |
| 2002/0122585 A1 * | 9/2002 | Swift et al. | 382/154 |
| 2003/0032033 A1 | 2/2003 | Anglin et al. | |
| 2005/0041120 A1 | 2/2005 | Miller | |
| 2005/0140679 A1 | 6/2005 | Kaneda | |
| 2005/0147309 A1 * | 7/2005 | Katata et al. | 382/239 |
| 2005/0149399 A1 | 7/2005 | Fukunaga et al. | |
| 2009/0091612 A1 | 4/2009 | Sekizawa et al. | |
| 2010/0295930 A1 * | 11/2010 | Ezhov | 348/58 |

FOREIGN PATENT DOCUMENTS

| | | |
|---|---|---|
| JP | 2000-050043 | 2/2000 |
| JP | 2002-016787 | 1/2002 |
| JP | 2003-111009 | 4/2003 |
| JP | 2004-088420 | 3/2004 |
| JP | 2004-129186 | 4/2004 |
| JP | 2004-173085 | 6/2004 |
| JP | 2004-343549 | 12/2004 |
| JP | 2005-065187 | 3/2005 |
| JP | 2005-252989 | 9/2005 |
| WO | WO 03/092305 | 11/2003 |
| WO | WO 2004/004363 | 1/2004 |

OTHER PUBLICATIONS

U.S. Appl. No. 11/922,742, filed Dec. 20, 2007, Hidehiko Sekizawa.

* cited by examiner

STEREO IMAGE REPRODUCING APPARATUS, STEREO IMAGE REPRODUCTION METHOD, STEREO IMAGE REPRODUCTION PROGRAM, AND RECORDING MEDIUM HAVING SUCH PROGRAM RECORDED THEREIN

TECHNICAL FIELD

The present invention relates to a stereo image processing apparatus for processing stereo images and a method therefor, and a stereo image reproducing apparatus for performing stereoscopic reproduction of stereo images and a method therefor; and further relates to a stereo image sheet on which stereo images are printed, a stereo image processing program, a stereo image reproduction program, and a computer readable recording medium having such program recorded therein.

This Application claims priority of the Japanese Patent Application No. 2005-189434, field on Jun. 29, 2005, the entirety of which is incorporated by reference herein.

RELATED ART

Hitherto, as a naked eye based method of permitting recognition of a plane surface image as a three-dimensional image by making use of parallax between both eyes, there are the parallel method (parallel-eyed method) and the crossing method (crossing-eyed method), etc. As shown in FIG. 1, the parallel method is a method of observing, among two left and right images having suitable parallax (hereinafter referred to as "stereo images") 114R, 114L, the image 114R of the right side by right eye $E_R$ and the image 114L of the left side by the left eye $E_L$. Moreover, as shown in FIG. 2, the crossing method is a method of observing the image 114R of the right side by the left eye $E_L$ and the image 114L of the left side by the right eye $E_R$.

As a method of picking up such stereo images, there are a method in which two lenses and image pick-up devices are arranged in line in left and right directions with a distance equivalent to spacing between human's eyes being maintained to simultaneously pick up, by the parallel method or the crossing method, left and right images by using theses two image pick-up systems, and the like. The technology relating to digital still camera employing such a mechanism is disclosed in the Japanese Patent Application Laid Open No. H5-30538 publication (Patent Literature 1).

Moreover, even if camera using such plural image pick-up systems is not used, a camera is moved by a distance equivalent to spacing between eyes of the human being in a horizontal direction from the position where image pick-up operation has been once performed to pick up an image of the same object for a second time from that position, or two cameras are used, etc., thereby making it possible obtain two images serving as stereo images.

In the above-described Patent Document 1, it is described that information indicating stereo images and/or left/right discrimination information, etc. are individually recorded as header information at respective left and right image data so that left and right image data are caused to be handled as single image handling unit at the time of processing in the recording/reproducing apparatus or the transmission apparatus thus to prevent inconvenience such that one of left and right image data is erroneously erased or transmitted, etc.

DISCLOSURE OF THE INVENTION

Problems to be Solved by the Invention

Meanwhile, a reproducing equipment in which stereo information for stereoscopic display control such as horizontal view points (the number of images) and/or horizontal shift quantity, etc. are added, as header information of files of respective left and right image data, in addition to discrimination information indicating stereo image and left/right discrimination information to thereby have ability to perform stereoscopic display of files of respective image files can perform stereoscopic display of stereo images on the basis of corresponding header information.

However, in the case where header information of file is broken or missing, it becomes difficult to perform stereoscopic display at the reproducing equipment. For example, in the case where stereo images are transferred in the form of printing matter, even if an image of that printing matter is read by scanner to have ability to obtain electronic data of the images, since header information is lost at this time point, it becomes difficult to perform stereoscopic display from the image data which has been read by the scanner.

The present invention has been proposed in view of circumstances as described above, and it is desirable to provide a stereo image processing apparatus and a method therefor which can perform stereoscopic reproduction of image without depending upon header information of file thus to have ability to recover or restore header information for stereoscopic display which has been broken or missing, a stereo image reproducing apparatus and a method therefor adapted for performing stereoscopic reproduction of stereo images, a stereo image sheet on which stereo images are printed, a stereo image processing program, a stereo image reproduction program, and a computer readable recording medium having such program recorded therein.

The stereo image processing apparatus according to an embodiment of the present invention is applied includes: an image input unit for inputting, as main images, plural images constituting stereo images; an encoding unit for encoding stereo information for stereoscopic display control with respect to the plural main images which have been inputted by the image input means into an image; and an image synthesis unit for synthesizing the plural main images which have been inputted by the image input unit and an encoded image which has been obtained by the encoding unit in the state where corresponding areas for respective images are partitioned.

This stereo image processing apparatus can perform stereoscopic reproduction of images without depending upon header information. Moreover, even if header information of file is broken or missing, it is possible to recover or restore header information from encoded information using visual symbol of stereo information added to synthetic image. In this example, the image synthesis unit may be an image synthesis unit for synthesizing padding data indicating whether plural main images are either stereo images by the parallel method or stereo images by the crossing method in the state where corresponding areas for the padding data and the main image are partitioned.

Thus, when an observer three-dimensionally views stereo images by naked eyes, it is possible to discriminate, at a glance, from visual features of the padding data, a suitable observation method of stereo images.

The stereo image processing apparatus according to an embodiment of the present invention is applied may further includes an aspect ratio adjustment input unit for inputting aspect adjustment ratio, wherein the image synthesis unit may be caused to be of the configuration to change size of padding data synthesized with plural image data so that longitudinal and lateral sizes of synthetic image have aspect adjustment ratio which has been inputted by the aspect ratio adjustment input unit.

In accordance with an embodiment of the present invention, it is possible to print synthetic image so that its entirety is just filled within printing paper.

Further, the stereo image processing apparatus according to an embodiment of the present invention is applied may further includes an encoding unit for compression-encoding an image which has been synthesized by the image synthesis unit, and a multiplexing unit for adding, as header information, stereo information for stereoscopic display control to the synthetic image which has been compression-encoded by the encoding unit to prepare a file.

Thus, it is possible to prepare file of stereo image, which permits stereoscopic reproduction of images, without depending upon header information. As a result, it is possible to record such file into a recording medium to transmit it to an external equipment which permits stereoscopic display.

Plural main images may be images for right eye and left eyes, or images obtained by capturing one object from plural view points.

Moreover, a stereo image reproducing apparatus as another embodiment of the present invention includes: a synthetic image input unit for inputting a synthetic image in which plural main images constituting stereo images and an encoded image of stereo information for stereoscopic display control with respect to the plural main images are synthesized in the state where corresponding areas for respective images are partitioned; a separation unit for separating the plural main images and the encoded image from the synthetic image which has been inputted by the synthesis image input means; a decoding unit for decoding stereo information from the encoded image which has been separated by the separation unit; and an image transforming unit for performing, on the basis of the stereo information which has been decoded by the decoding unit, processing for stereoscopic display with respect to the plural main images which have been separated by the separation unit.

In accordance with the stereo image reproducing apparatus, it is possible to perform stereoscopic reproduction of image without depending upon header information.

The stereo image sheet as a further embodiment of the present invention is adapted so that plural main images constituting stereo images and an encoded image of stereo information for stereoscopic display control with respect to the plural main images are arranged or assigned in the state where corresponding areas for respective images are partitioned.

By reading this stereo image sheet by means of scanner to separate the encoded information using visual symbol of stereo information from the images which have been read thereinto to decode the encoded information thus obtained, it is possible to perform stereoscopic reproduction of images without depending upon header information.

As described above, by employing en embodiment of the present invention, it is possible to perform stereoscopic reproduction of images without depending upon header information of file, and it is possible to recover or restore header information for stereoscopic display which has been broken or missing.

Still more further features and advantages of the present invention and practical merits obtained by the present invention will become more apparent from the embodiments which will be explained below with reference to the attached drawings.

BEST MODE FOR CARRYING OUT THE INVENTION

Best mode for carrying out the present invention will now be explained with reference to the attached drawings.

Figure 1:
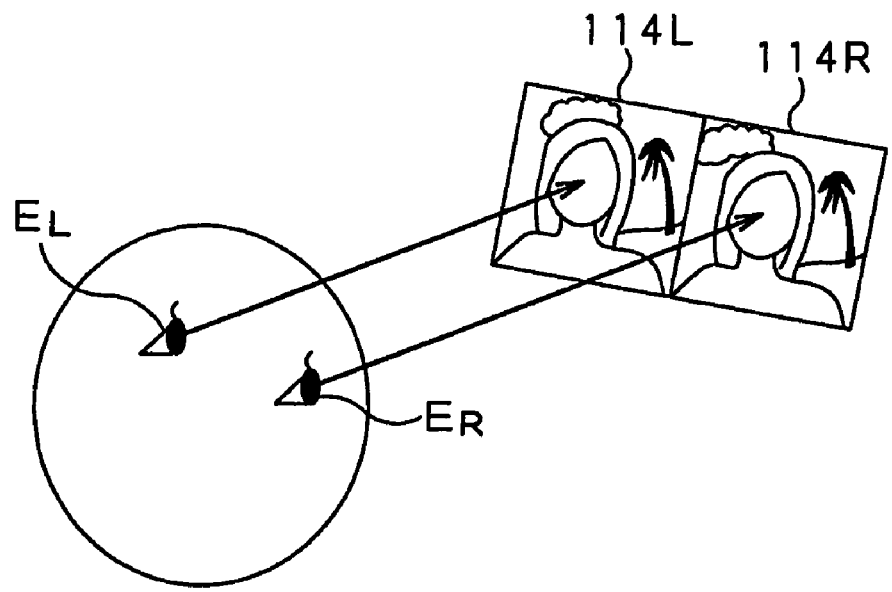
FIG. 1 is a view showing the parallel method for permitting recognition of plane surface image as three-dimensional image.
Figure 2:
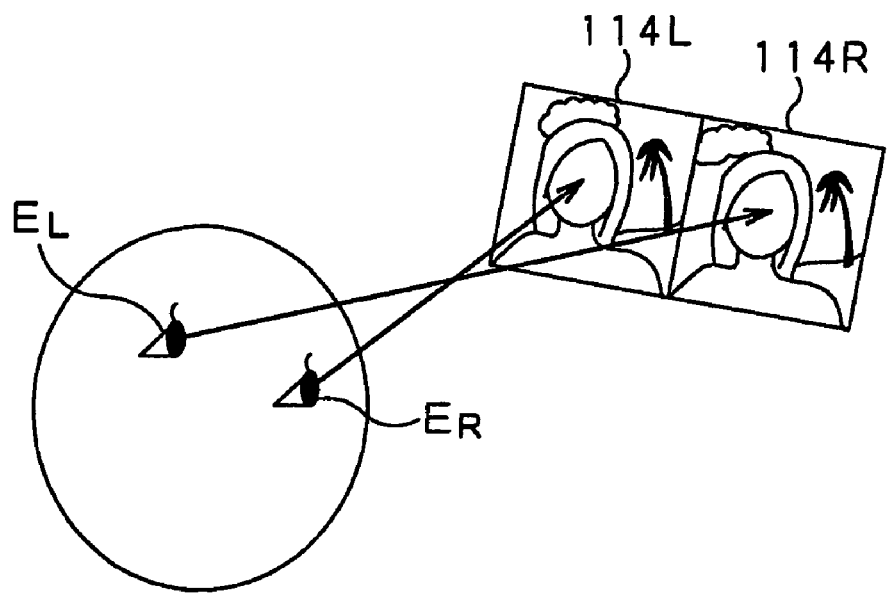
FIG. 2 is a view showing the crossing method for permitting recognition of plane surface image as three-dimensional image.
Figure 3:
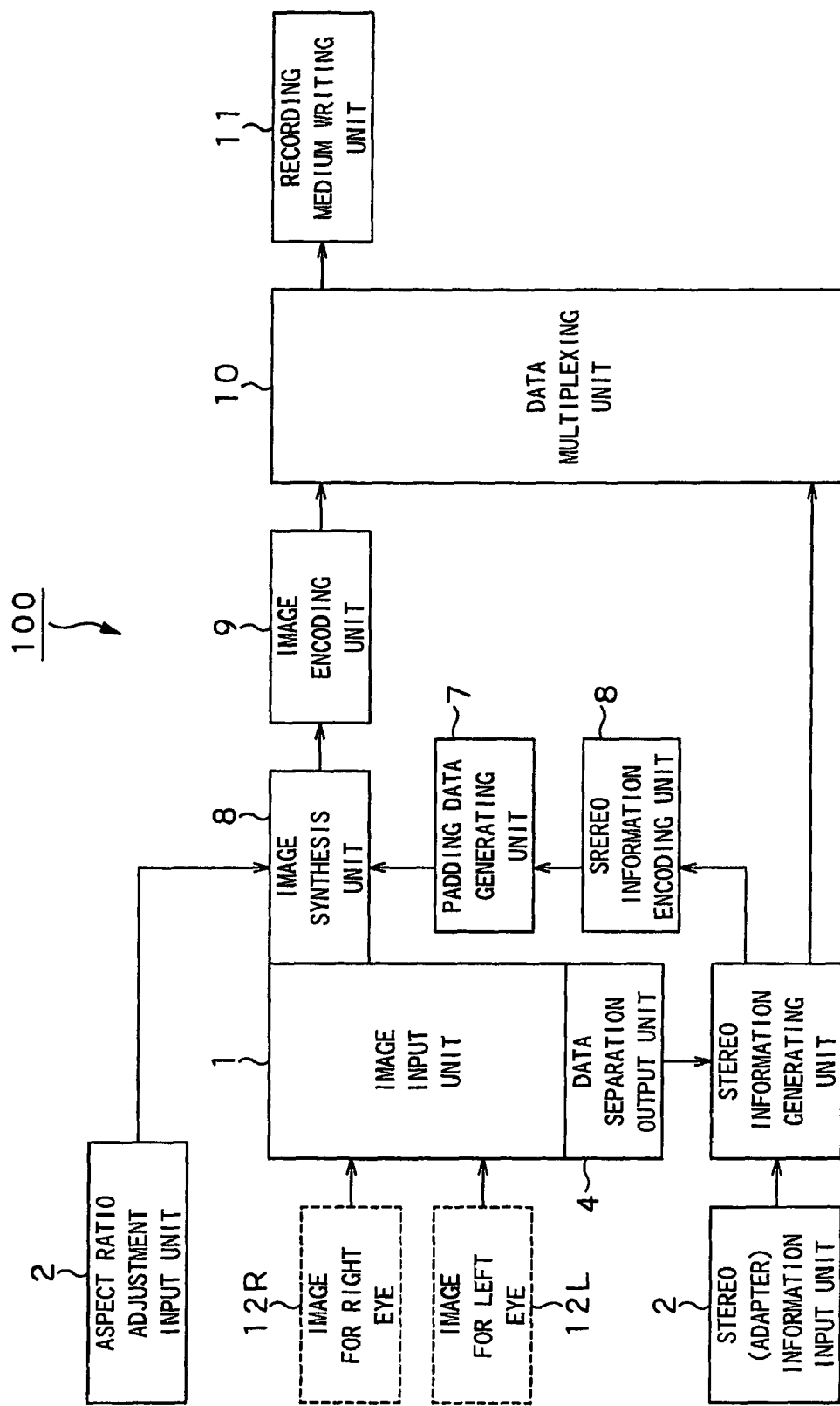
FIG. 3 is a block diagram showing an embodiment of a stereo image processing apparatus according to the present invention.

A stereo image processing apparatus 100 according to an embodiment of the present invention is applied includes, as shown in FIG. 3, an image input unit 1, an aspect ratio adjustment input unit 2, a stereo (adapter) information input unit 3, a data separation output unit 4, a stereo information generating unit 5, a stereo information encoding unit 6, a padding data generating unit 7, an image synthesis unit 8, an image encoding unit 9, a data multiplexing unit 10, and a recording medium writing unit 11.

The image input unit 1 is means for inputting respective image files 12R, 12L for right eye and left eye in which stereo information for stereoscopic display control such as discrimination information indicating stereo image, left/right discrimination information, the number of horizontal view points (the number of images) and horizontal shift quantity, etc. are respectively added, as header information, to image information (main images) for right eye and left eye.

The data separation output unit 4 is means for separating header information from respective image files 12R, 12L for right eye and left eye which have been inputted at the image input unit 1 to output them to the stereo information generating unit 5.

The stereo (adapter) information input unit 3 is means for inputting stereo information except for the contents included in header information of respective image files 12R, 12L for right eye and left eye which have been inputted, e.g., at least parallel method/crossing method discrimination information indicating whether images of the respective image files 12R, 12L which have been inputted are either stereo images by the parallel method or stereo images by the crossing method.

The stereo information generating unit 5 is means for generating, on the basis of stereo information which has been inputted from the stereo (adapter) information input unit 3 and header information which have been outputted from the data separation output unit 4, stereo information to be outputted to the stereo information encoding unit 6 and the data multiplexing unit 10.

The stereo information encoding unit 6 is means for encoding stereo information which has been outputted from the stereo information generating unit 5 into an image for permitting discrimination by image synthesis such as one-dimensional bar code or two-dimensional bar code, etc. Moreover, parallel method/crossing method discrimination information in the stereo information is transferred to the padding data generating unit 7 through the stereo information encoding unit 6.

The padding data generating unit 7 is means for generating padding data to be synthesized with respective main images for right eye and left eye on the basis of parallel method/crossing method discrimination information which has been outputted from the stereo information generating unit 6 to output the padding data thus generated to the image synthesis unit 8 along with an encoded image of stereo information which has been outputted from the stereo information encoding unit 6.

Here, padding data are data for embedding empty areas formed in the case where respective main images for right eye and left eye are arranged in line in left and right directions within two-dimensional space having a predetermined aspect adjustment ratio. The padding data is data in which parallel method/crossing method discrimination information is represented by visual feature such as color or pattern, etc. that, e.g., the human being can discriminate at a glance. At a predetermined position of the padding data, encoded image of stereo information is disposed. It is not necessary for the encoded image of stereo information to be such an image which can be immediately discriminated by the human being, but there may be employed an image which permits encoding of all stereo information necessary for stereoscopic display control. Accordingly, characters such as numerals and/or symbols, etc. may be also used for encoding of stereo information.

The aspect ratio adjustment input unit 2 is means for inputting aspect adjustment ratio of synthetic image of main image and padding data. This aspect adjustment ratio is inputted in conformity with, e.g., ratio between size in longitudinal direction and size in lateral direction of a printing paper used.

The image synthesis unit 8 is means for synthesizing respective main images for right eye and left eye which have been inputted from the image input unit 1 and encoded image of stereo information and padding data which have been outputted from the padding data generating unit 7 to generate single image data having an aspect adjustment ratio which has been inputted from the aspect ratio adjustment input unit 2.

The image encoding unit 9 is means for compression-encoding synthetic image which has been outputted from the image synthesis unit 8 in accordance with a predetermined system, e.g., JPEG system, etc.

The data multiplexing unit 10 is means for multiplexing synthetic image which has been compression-encoded by the image encoding unit 9 and stereo information which has been outputted from the stereo information generating unit 5. In this example, stereo information is added as header information of image file.

The recording medium writing unit 11 is means for writing image file which has been generated by the data multiplexing unit 10 into writable or rewritable non-volatile recording medium e.g., EEPROM, etc.

Then, the operation of the stereo image processing apparatus 100 will be explained.

Figure 4:
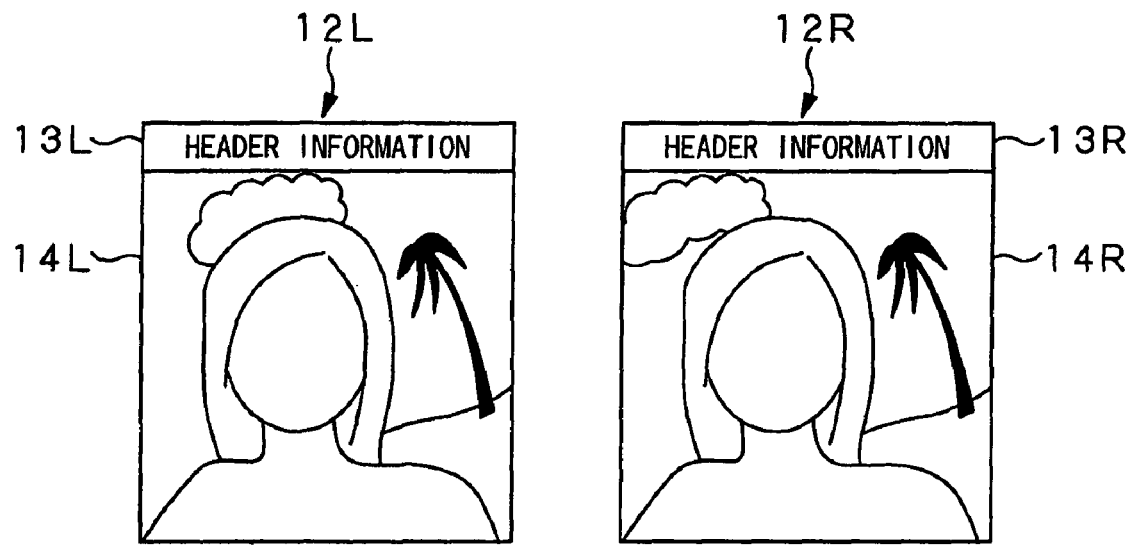
FIG. 4 is a view showing the configuration of image file inputted to the stereo image processing apparatus shown in FIG. 3.

Let consider the case where image files 12R, 12L in which stereo information for stereoscopic display control such as discrimination information indicating stereo image, left/right discrimination information, the number of horizontal view points (the number of images) and/or horizontal shift quantity, etc. are respectively added to main images 14R, 14L as header information 13R, 13L are inputted as image files 12R, 12L for right eye and left eye as shown in FIG. 4. In this case, before input of image file, parallel method/crossing method discrimination information indicating whether an image file inputted from now on is either stereo image by the parallel method or stereo image by the crossing method is inputted from the stereo (adapter) information input unit 3 to set it at the stereo information generating unit 5. On the other hand, aspect adjustment ratio caused to be in conformity with ratio between size in longitudinal direction and size in lateral direction of printing paper used is inputted from the aspect ratio adjustment input unit 2 to set it as aspect adjustment ratio for synthesis of image at the image synthesis unit 8.

After setting operations at the stereo information generating unit 5 and the image synthesis unit 8 have been completed, respective image files 12R, 12L for right eye and left eye are inputted at the image input unit 1 to transfer main images 14R, 14L at the respective image files 12R, 12L to the image synthesis unit 8, and to separate and extract, at the data separation output unit 4, header information 13R, 13L of the respective image files 12R, 12L to output them to the stereo information generating unit 5.

When the stereo information generating unit 5 acquires the header information 13R, 13L of the respective image files 12R, 12L from the data separation output unit 4, it generates stereo information to be outputted to the stereo information encoding unit 6 and the data multiplexing unit 10 from the header information 13R, 13L and stereo information (at least parallel method/crossing method discrimination information) which have been already set by input from the stereo (adapter) information input unit 3 to output the stereo information thus obtained to the respective units.

Thereafter, at the stereo information encoding unit 6, stereo information which has been outputted from the stereo information generating unit 5 is encoded into an image such as one-dimensional bar code or two-dimensional bar code, etc. The encoded image of the stereo information is outputted to the padding data generating unit 7 along with parallel method/crossing method discrimination information in the stereo images which have been outputted from the stereo information generating unit 5.

Then, at the padding data generating unit 7, generation of padding data corresponding to the parallel method/crossing method discrimination information which has been outputted from the stereo information encoding unit 6 is performed. The generated padding data thus obtained is outputted to the image synthesis unit 8 along with encoded image of the stereo information which has been outputted from the stereo information encoding unit 6.

Then, at the image synthesis unit 8, respective main images 14R, 14L for right eye and left eye which have been transferred from the image input unit 1, padding data and encoded image of stereo information from the padding data generating unit 7 are synthesized. Thus, single synthetic image having an aspect adjustment ratio which has been set by input from the aspect ratio adjustment input unit 2 is generated.

Figure 5:
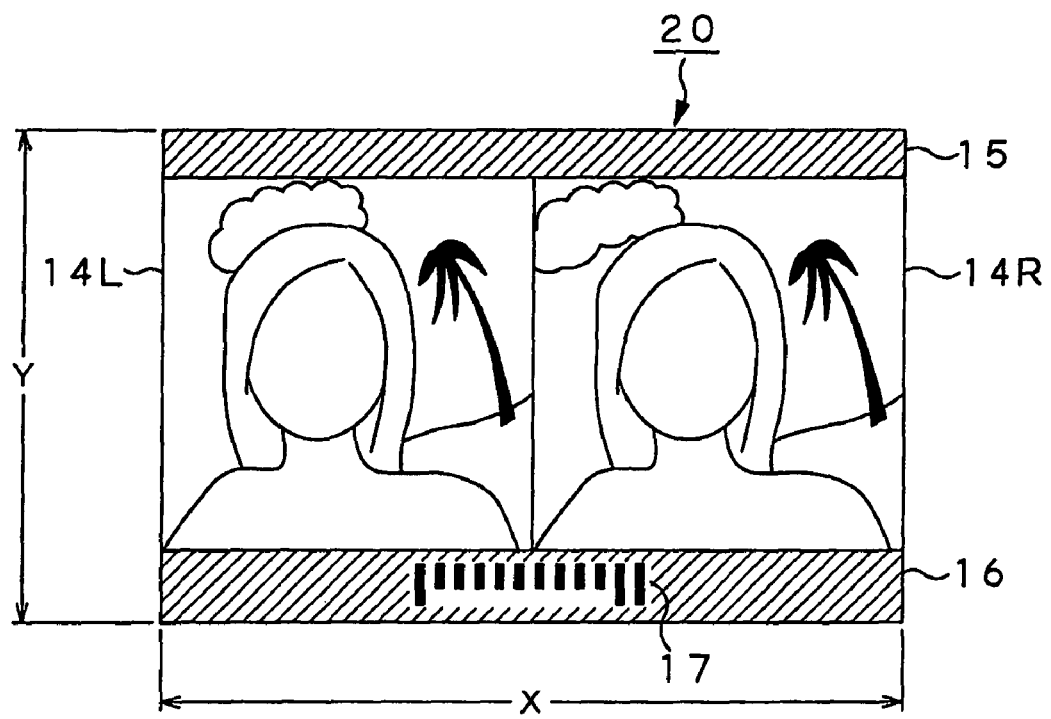
FIG. 5 is a view showing an example of synthetic image in the case where image is stereo image obtained by the parallel method.
Figure 6:
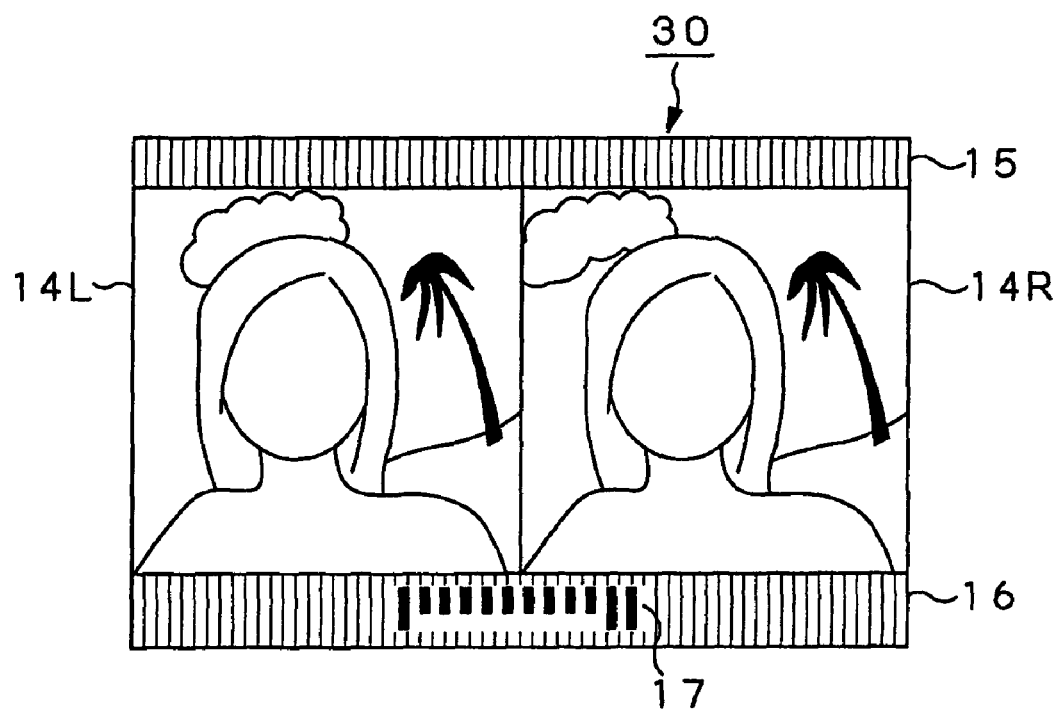
FIG. 6 is a view showing an example of synthetic image in the case where image is stereo image obtained by the crossing method.

FIGS. 5 and 6 show examples of synthetic images 20, 30 which have been generated by the image synthesis unit 8, wherein FIG. 5 shows synthetic image 20 in the case where respective main images 14R, 14L are stereo images by the parallel method and FIG. 6 shows synthetic image 30 in the case where respective main images 14R, 14L are stereo images by the crossing method. As stated above, in the parallel method and the crossing method, arrangement orders in horizontal direction of the respective main images 14R, 14L are opposite to each other.

In this example, padding data 15, 16 serving as visual parallel method/crossing method discrimination information are arranged at upper and lower portions of left and right main images 14R, 14L. Longitudinal and lateral sizes of the synthetic images 20, 30 are determined by aspect adjustment ratio which has been inputted from the aspect ratio adjustment input unit 2. Namely, in FIG. 5, length of long side (lateral length in this example) of respective main images 14R, 14L arranged in left and right directions is caused to be lateral length X of the synthetic image 20, and longitudinal length Y of the synthetic image 20 is determined from the lateral length X of the synthetic image 20 and the aspect adjustment ratio. Namely, the image synthesis unit 8 variably adjusts size of padding data so that longitudinal and lateral sizes of the synthetic image have aspect adjustment ratio designated in advance to synthesize the padding data thus obtained with left and right main images 14R, 14L.

The positions in the vertical direction of respective main images 14R, 14L at the synthetic images 20, 30 are caused to be peculiar to the system. In this example, determination is made such that respective main images 14R, 14L are arranged substantially at the intermediate position in the vertical direction. Accordingly, in this example, in the synthetic images 20, 30, areas of padding data 15, 16 are ensured at upper and lower portions of the respective main images 14R, 14L. It should be noted that the arrangement in which areas of padding data are ensured at upper and lower portions of the respective main images 14R, 14L in this way is only one example. An area of padding data may be ensured only at either one of upper portion and lower portion of respective main images 14R, 14L.

Moreover, in this example, one-dimensional bar code serving as encoded image 17 of stereo information is arranged in the padding data 16 of the lower area of each of synthetic images 20, 30. It is a matter of course that encoded image 17 of stereo information may be arranged in the padding data 15 of the upper area, or encoded images thereof may be respectively arranged at upper and lower portions thereof. Further, plural encoded images 17 of stereo information may be arranged in one padding data 15 or 16 area.

Figure 7:
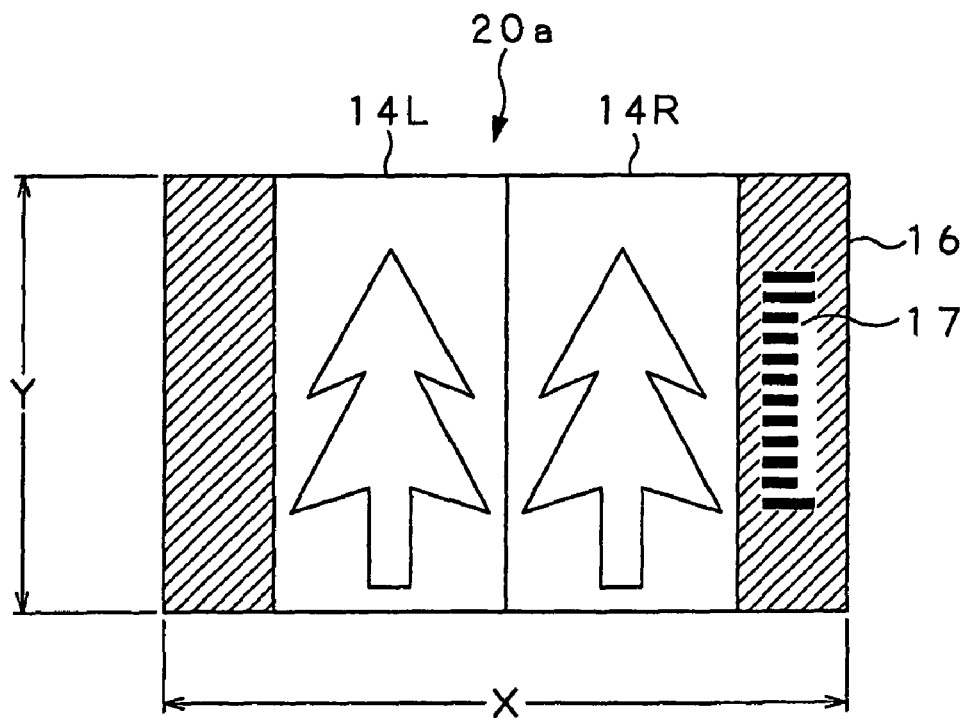
FIG. 7 is a view showing another example of synthetic image.

Further, as shown in FIG. 7, in the case where main images 14R, 14L arranged in left and right directions are long in longitudinal direction as a whole, long sides of respective main images 14R, 14L are caused to be longitudinal side and the length of longitudinal side is caused to be longitudinal length Y of synthetic image 20a to determine lateral length X of the synthetic image 20a from the longitudinal length Y of the synthetic image 20a and the aspect adjustment ratio. Accordingly, in this case, padding data 15, 16 serving as visual parallel method/crossing method discrimination information are arranged at left and right portions of main images 14R, 14L, and encoded image 17 of stereo information is arranged in the padding data 16 of one area.

Figure 8:
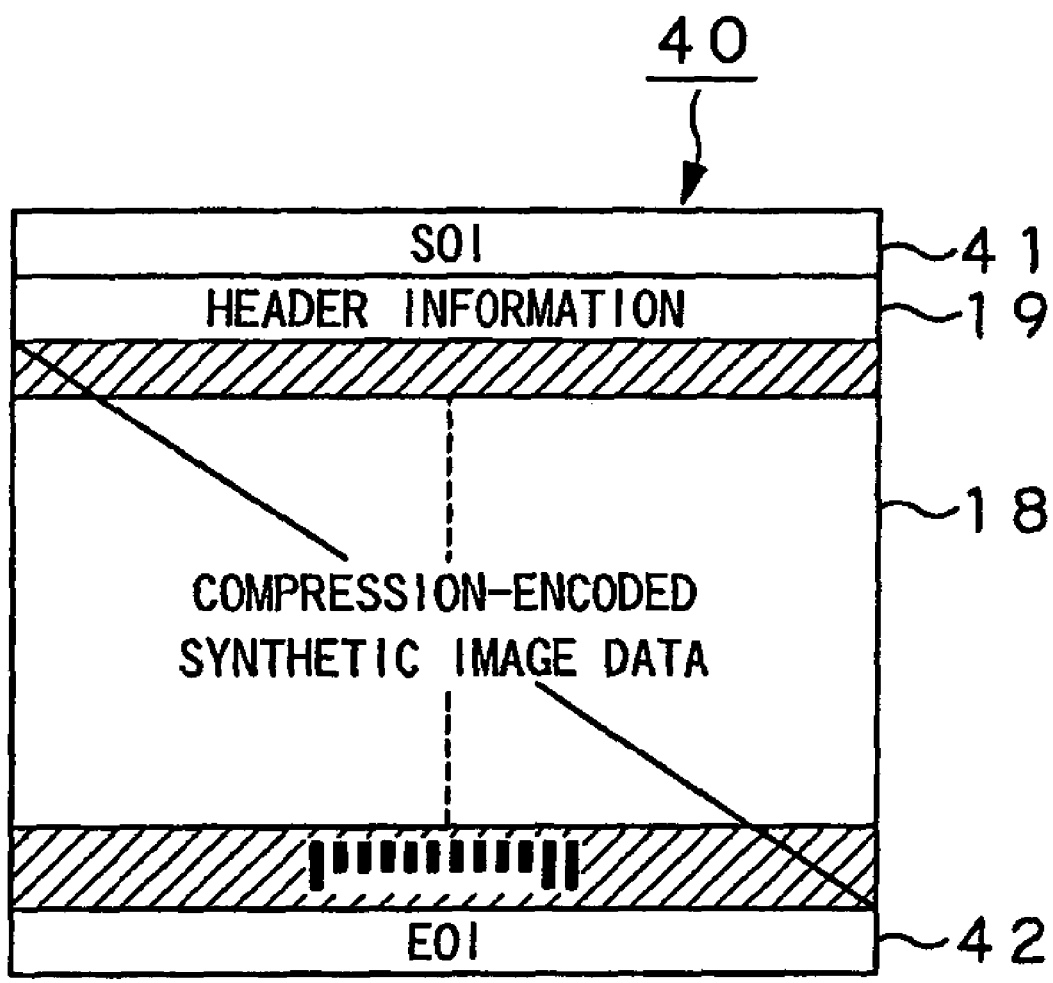
FIG. 8 is a view showing the configuration of file of stereo image outputted from the stereo image processing apparatus shown in FIG. 3.

The synthetic image obtained by the image synthesis unit 7 as stated above is compression-encoded in accordance with a predetermined system, e.g., JPEG system, etc. by the image encoding unit 9, and is sent to the data multiplexing unit 10, at which the compression-encoded synthetic image and header information including the content of stereo information from the stereo information generating unit 5 are multiplexed. Thus, file of stereo image is prepared. The configuration of file 40 of this stereo image is shown in FIG. 8. As shown in FIG. 8, the file 40 of the stereo image includes of compression-encoded synthetic image 18, header information 19, SOI41 indicating leading portion of the file 40, and EOI42 indicating end of the file 40, etc. The file 40 of the stereo image thus prepared is recorded into the recording medium by the recording medium writing unit 11.

As stated above, in accordance with the stereo image processing apparatus 100 of this embodiment, it is possible to prepare file 40 in which stereo information and parallel method/crossing method discrimination information are added to synthetic image. Thus, it is possible to perform stereoscopic reproduction of images without depending upon header information of file 40 of stereo image. Further, by reading, from a stereo image sheet as printed matter of synthetic image, its synthetic image by means of scanner to decode encoded image of stereo information and padding data which exist therein, it is possible to perform stereoscopic reproduction of image. Moreover, since stereo information and parallel method/crossing method discrimination information are added to the synthetic image, even if header information of file 40 of stereo image has been broken or missing, it is possible to recover or restore header information from encoded image of stereo information added to synthetic image.

Moreover, in observing, by naked eyes, stereo images stored at file 40 of stereo images, a reproducing equipment capable of decoding compression-encoded synthetic image of file 40 of stereo images is caused to read thereinto files 40 of stereo images through network or detachably recording medium, etc. Thus, as shown in FIG. 5 or 6, synthetic image 20 or synthetic image 30 of respective main images 14R, 14L for right eye and left eye and padding data 15, 16 is reproduced. In this instance, an observer can discriminate, at a glance, from visual features such as color and/or pattern, etc. of padding data 15, 16 displayed, whether respective main images 14R, 14L for right eye and left eye are either stereo images by the parallel method or stereo images by the crossing method. Accordingly, it is possible to immediately attempt or perform stereoscopic observation by a suitable observation method to have ability to exclude excess burden of the observer.

Moreover, since aspect ratio of synthetic image of main images and padding data, which has been recorded in the recording medium, is determined in conformity with ratio between longitudinal and lateral sizes of a printing paper used, it is possible to print the synthetic image so that its entirety is just filled within the printing paper. Further, an observer can discriminate, at a glance, from visual features of padding data area on the stereo image sheet which is the result in which the entirety of the synthetic image has been printed on the printing paper, whether it is suitable to observe stereo images on the stereo image sheet by the crossing method, or to observe them by the parallel method.

Then, a reproducing apparatus adapted for performing stereoscopic reproduction of stereo images stored at file 40 of the stereo images which have been prepared by the above-described stereo image processing apparatus 100 will be explained.

Figure 9:
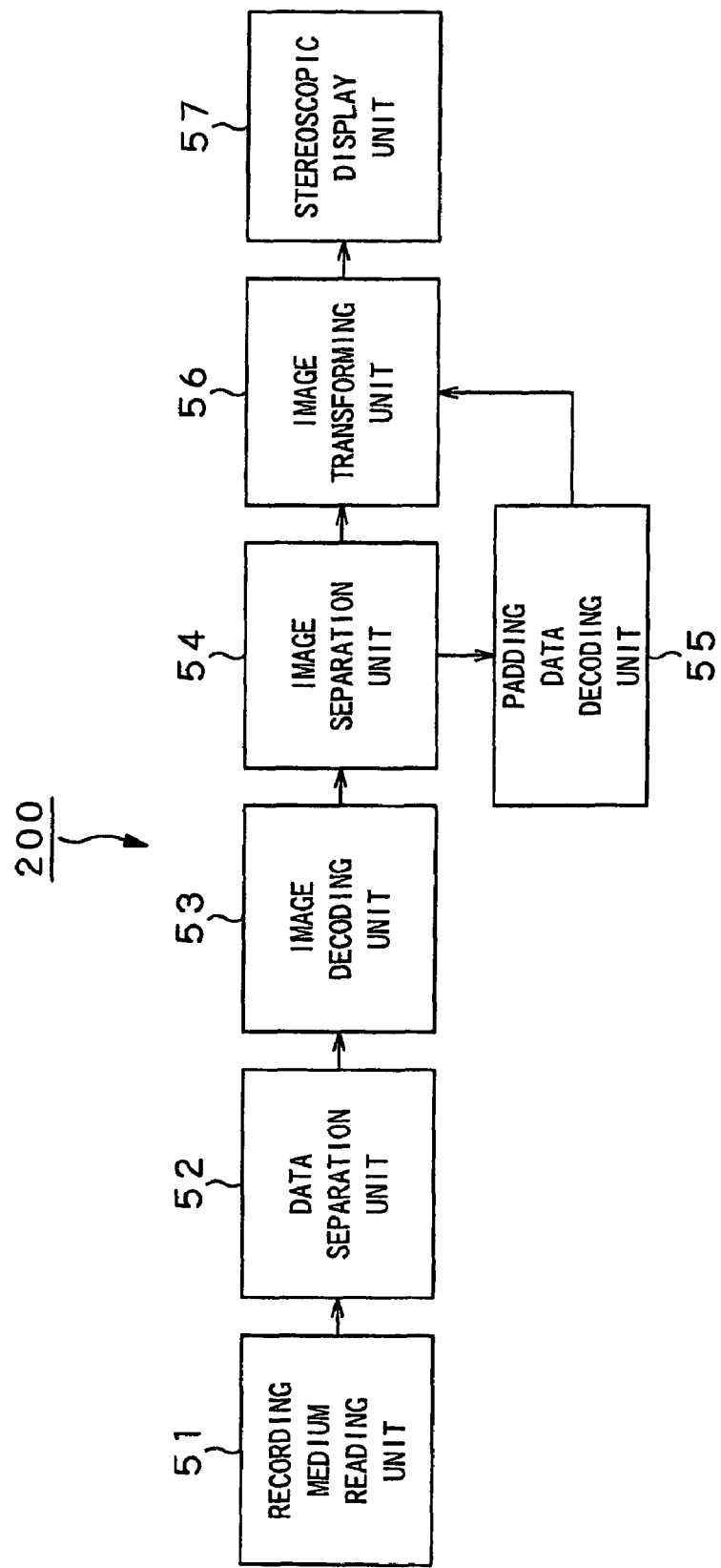
FIG. 9 is a block diagram showing an embodiment of a stereo image reproducing apparatus according to the present invention.

This stereo image reproducing apparatus 200 includes, as shown in FIG. 9, a recording medium reading unit 51, a data separation unit 52, an image decoding unit 53, an image separation unit 54, a padding data decoding unit 55, an image transforming unit 56, and a stereoscopic display unit 57.

In this example, the recording medium reading unit 51 is means for reading thereinto file 40 of stereo images from detachable recording medium. The data separation unit 52 is means for separating/extracting main image, i.e., the compression-encoded synthetic image 18 shown in FIG. 8 from the file 40 of stereo images which have been read thereinto from the recording medium. The image decoding unit 53 is means for decoding/decompressing the compression-encoded synthetic image 18 which has been separated/extracted by the data separation unit 52. The image separation unit 54 serves to separate, from the decoded/decompressed synthetic image, left and right main images, encoded image of stereo information and padding data to distribute the left and right main images to the image transforming unit 56, and to distribute the encoded information of stereo information and the padding data to the padding data decoding unit 55. The padding data decoding unit 55 is means for discriminating encoded image of stereo information and padding data by color discrimination or pattern recognition, etc. to decode the encoded image of stereo information to restore original stereo information, and to restore parallel method/crossing method discrimination information from the padding data. The image transforming unit 56 is means for executing arithmetic processing for stereoscopic display with respect to left and right main images on the basis of the stereo information and the parallel method/crossing method discrimination information which have been restored to output the results to the stereoscopic display unit 57. The stereoscopic display unit 57 is means for performing stereoscopic display of image.

Then, the operation of the stereo image reproducing apparatus 200 will be explained.

Ordinarily, in the reproducing apparatus, stereoscopic reproduction of image is performed on the basis of header information of file 40 of stereo images. However, in this stereo image reproducing apparatus 200, there is employed, without depending upon header information, an approach to decode encoded image of stereo information and padding data which exist in synthetic image to perform stereoscopic reproduction of images on the basis of these decoded information.

Initially, at the recording medium reading unit 51, file 40 of stereo image is read thereinto from the detachable recording medium. Then, at the data separation unit 52, main image, i.e., compression-encoded image 18 shown in FIG. 8 is separated and extracted from file 40 of the stereo image which has been read thereinto from the recording medium. At the image decoding unit 53, the synthetic image 18 thus obtained is decoded and decompressed.

Subsequently, at the image separation unit 54, left and right main images and padding data including encoded image of stereo information are separated from the synthetic image which has been decoded and decompressed. The left and right main images are outputted to the image transforming unit 56. Moreover, the encoded image of stereo information and padding data are outputted to the padding data decoding unit 55 so that original stereo information and parallel method/crossing method discrimination information are restored. Further, at the image transforming unit 56, arithmetic processing for stereoscopic display is performed with respect to left and right main images on the basis of the stereo information and the parallel method/crossing method information which have been restored. The result thus obtained is displayed on the stereoscopic display unit 57.

As stated above, in accordance with the stereo image reproducing apparatus 200 of this embodiment, it is possible to perform stereoscopic reproduction of images without depending upon header information of file 40 of stereo information.

Moreover, while the recording medium reading unit 51 is caused to be of the configuration, in the above-described stereo image reproducing apparatus 200, to read thereinto file 40 of stereo image from the detachable recording medium, there may be employed a configuration using image taking-in unit such as scanner, etc. in place of the recording medium reading unit 51.

Figure 10:
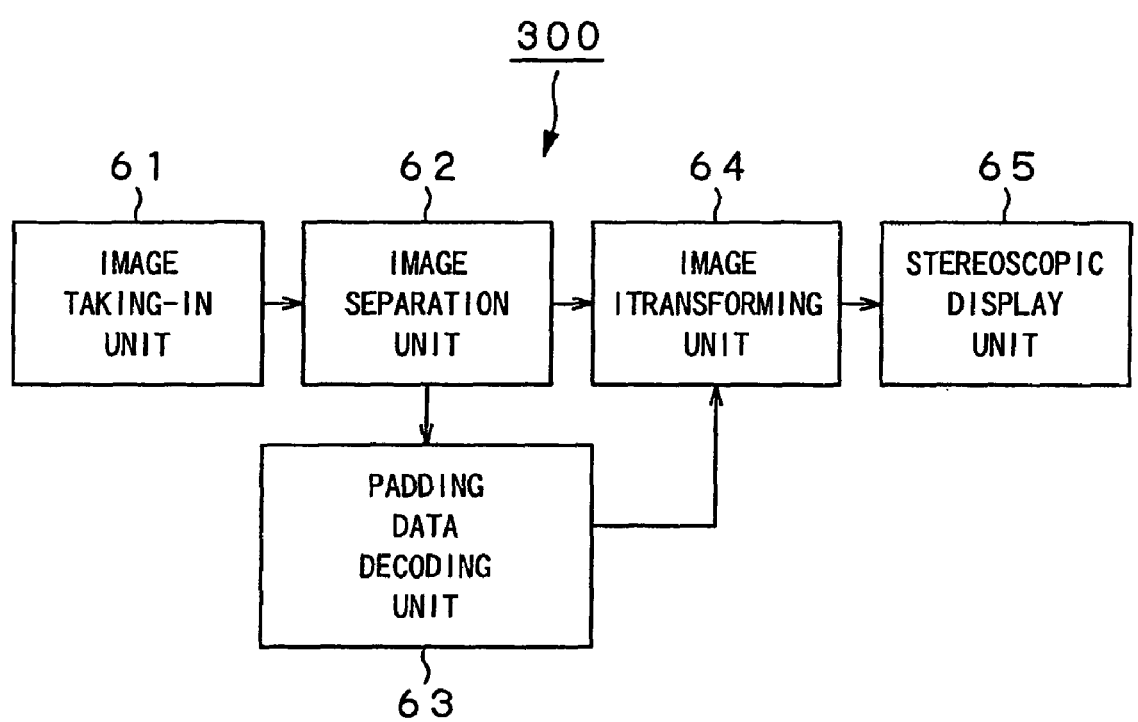
FIG. 10 is a block diagram showing a stereo image reproducing apparatus using an image taking-in unit.

The stereo image reproducing apparatus 300 using such image taking-in unit is constituted as shown in FIG. 10, and includes an image taking-in unit 61 for taking thereinto, from stereo image sheet serving as printed matter of synthetic image, the synthetic image thereof, an image separation unit 62 for separating, from the synthetic image which has been taken in at the image taking-in unit 61, left and right main images, encoded image of stereo information and padding data, a padding data decoding unit 63 for discriminating encoded image of stereo information and padding data by color discrimination or pattern recognition, etc. to decode encoded image of stereo information to restore original stereo information, and to restore parallel method/crossing method discrimination information from the padding data, an image transforming unit 64 for executing arithmetic processing for stereoscopic display with respect to left and right main images on the basis of the stereo information and the parallel method/crossing method discrimination information which have been restored, and a stereoscopic display unit 65 for performing stereoscopic display of images.

By the stereo image reproducing apparatus 300 having such a configuration, it is possible to perform stereoscopic reproduction of images from printed matter of synthetic image.

Meanwhile, in connection with the description of horizontal shift quantity in stereo information, there is employed in this embodiment, a description method of "shiftX; 15/1024", i.e., 15 pixels within 1024 pixels are shifted in horizontal direction. Thus, even if printed synthetic image is taken in at a resolution different from primary resolution at the image taking-in unit, it is possible to calculate a suitable horizontal shift quantity from the ratio between both resolutions and the horizontal shift quantity. Thus, satisfactory stereoscopic reproduction can be realized.

Then, a stereo image processing apparatus adapted for recovering or restoring header information of stereo image file from encoded image of stereo information added to synthetic image will be explained.

Figure 11:
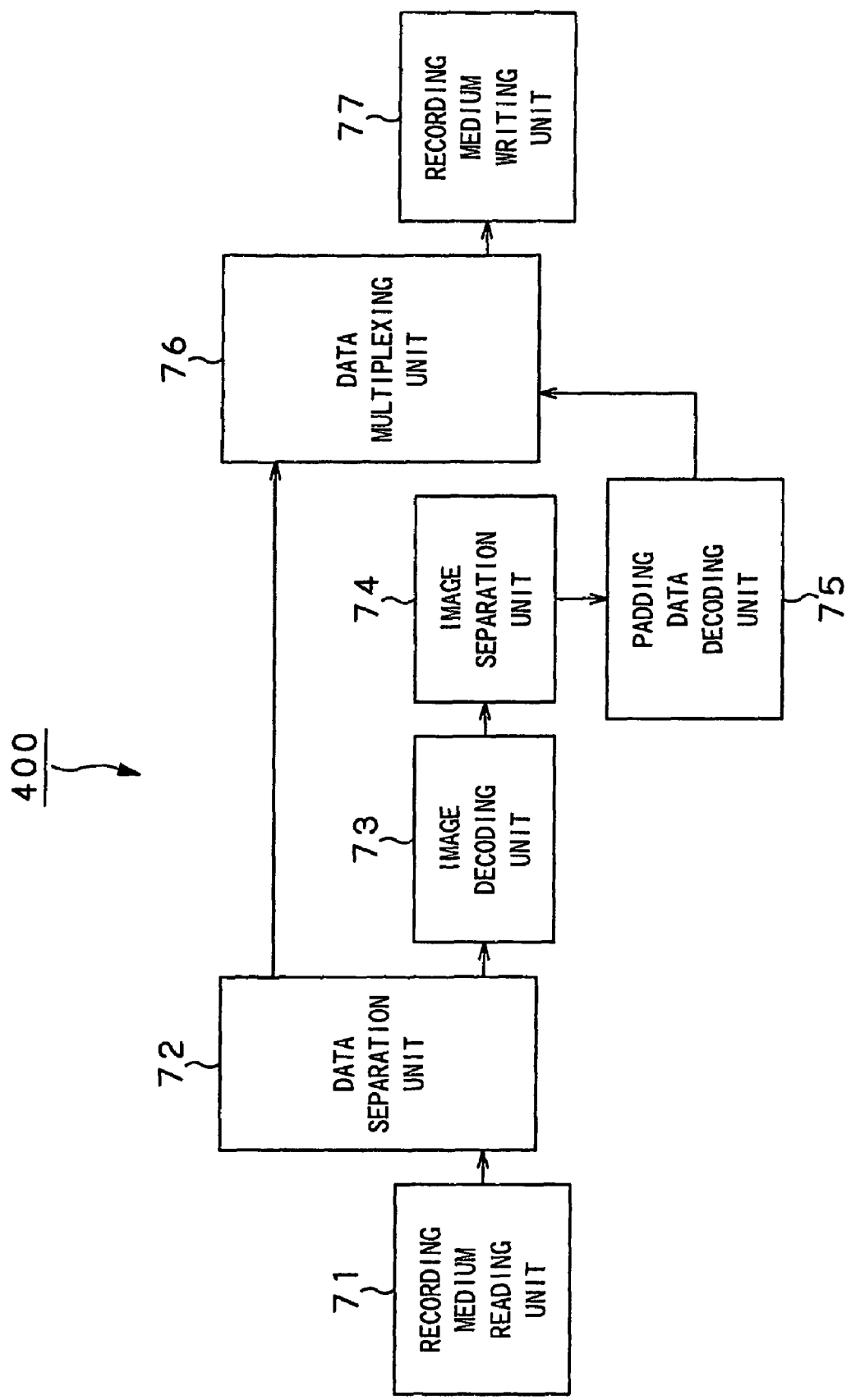
FIG. 11 is a block diagram showing a stereo image processing apparatus which can recover or restore header information.

The stereo image processing apparatus 400 includes, as shown in FIG. 11, a recording medium reading unit 71 for reading thereinto file 40 of stereo image from a detachable recording medium, a data separation unit 72 for separating/extracting main image, i.e., compression-encoded synthetic image from file 40 of stereo image which has been read thereinto from the recording medium, an image decoding unit 73 for decoding/decompressing compression-encoded synthetic image which has been separated/extracted by the data separation unit 72, an image separation unit 74 for separating, from the synthetic image which has been decoded and decompressed, left and right main images, encoded image of stereo information and padding data, a padding data decoding unit 75 for discriminating encoded image of stereo information and padding data by color discrimination or pattern recognition, etc. to decode encoded image of stereo information to restore original stereo information, and to restore parallel method/crossing method discrimination information from padding data to generate header information, a data multiplexing unit 76 for multiplexing the compression-encoded synthetic image which has been separated/extracted by the data separation unit 72 and the header information which has been restored at the padding data decoding unit 75 to prepare image file of stereo information, and a recording medium writing unit 77 for writing the image file of stereo information which has been prepared by the data multiplexing unit 76 into the detachable recording medium.

By the stereo image processing apparatus 400 having such a configuration, it is possible to recover or restore header information of stereo image file from encoded image of stereo information added to synthetic image.

While two image data for right eye and left eye are synthesized with padding data in the above-described embodiment, image data of three view points or more (plural eyes), encoded image of stereo information and padding data may be synthesized.

Figure 12:
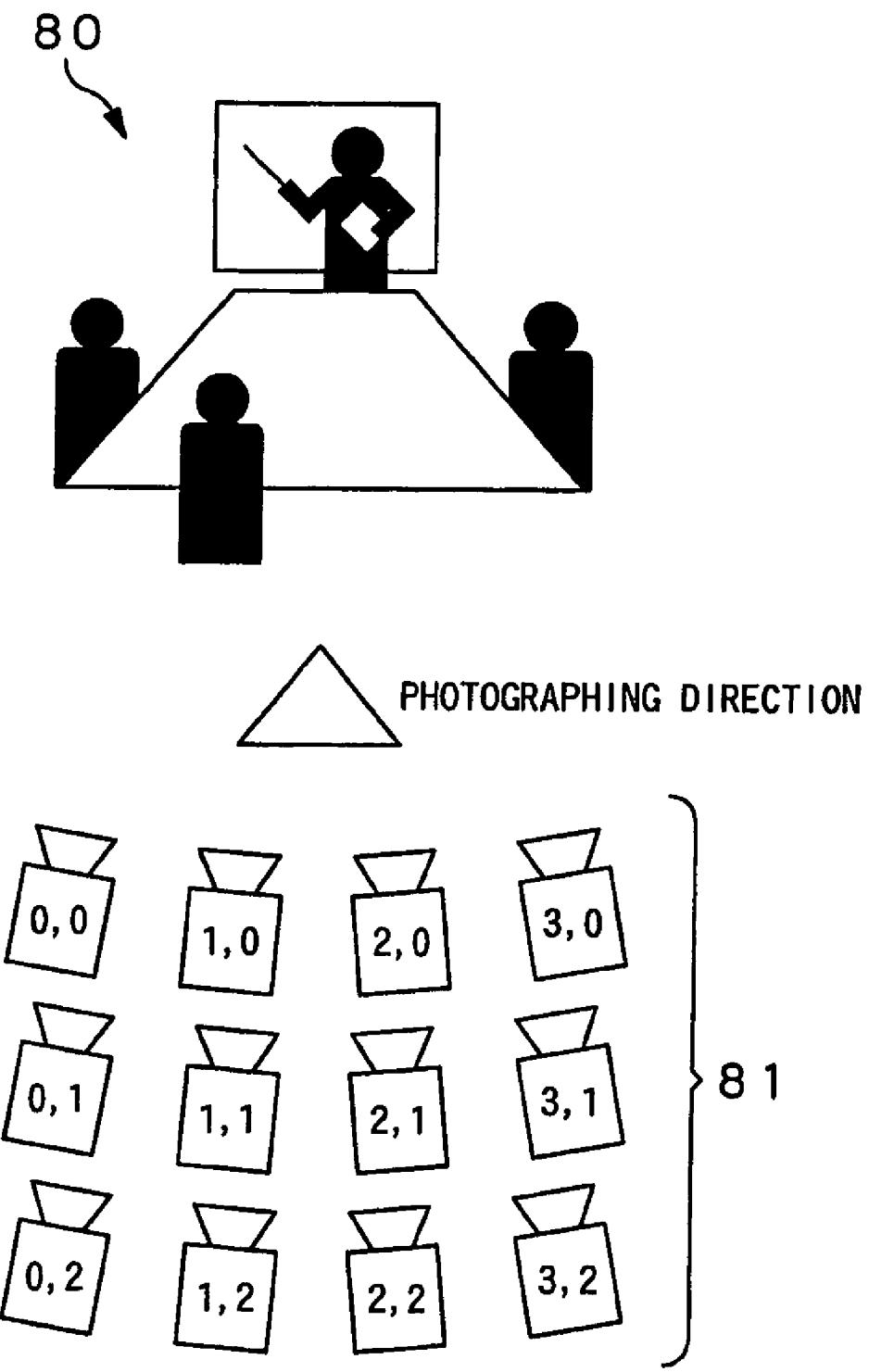
FIG. 12 is a view showing an embodiment in which an image of one object is picked up by plural digital still cameras arranged in forward and backward directions and in left and right directions.

Here, e.g., as shown in FIG. 12, respective image files are obtained by adding, as header information, stereo information for stereoscopic display control to respective main images obtained by simultaneously picking up one object 80 by plural digital still cameras 81 (0, 0) . . . 81 (3, 2) arranged in forward and backward directions and in left and right directions.

Figure 13:
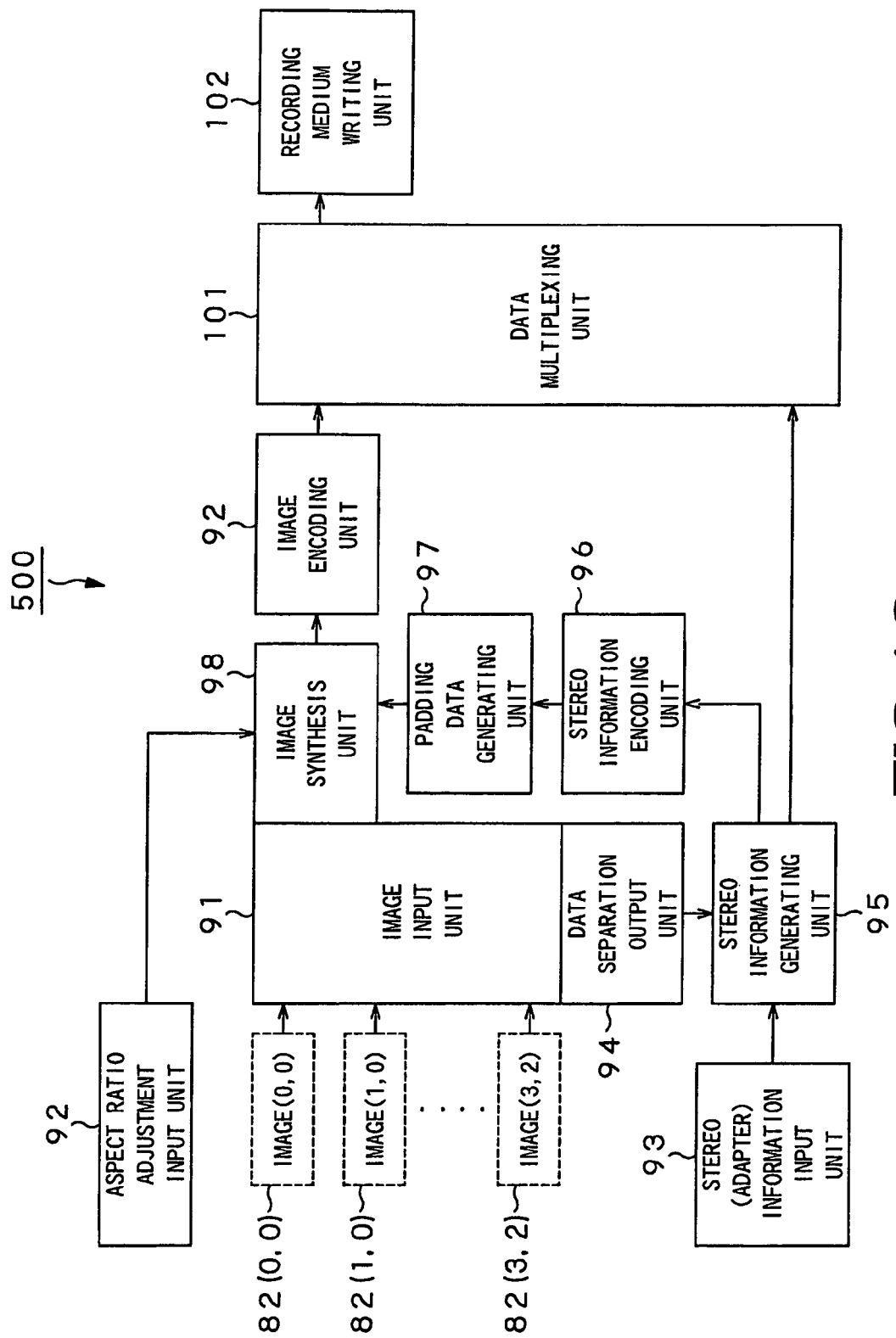
FIG. 13 is a block diagram showing another embodiment of the stereo image processing apparatus according to the present invention.

FIG. 13 is a block diagram showing the entire configuration of a stereo image processing apparatus 500 of this embodiment.

The stereo image processing apparatus 500 includes, as shown in FIG. 13, an image input unit 91, an aspect ratio adjustment input unit 92, a stereo (adapter) information input unit 93, a data separation output unit 94, a stereo information generating unit 95, a stereo information encoding unit 96, a padding data generating unit 97, an image synthesis unit 98, an image encoding unit 99, a data multiplexing unit 101, and a recording medium writing unit 102.

The image input unit 91 is means for inputting plural image files 82 (0, 0), 82 (0, 1), . . . , 82 (3, 2) in which stereo information for stereoscopic display control such as discrimination information indicating stereo image, discrimination information of positions of view points (cameras), the number of horizontal view points (the number of images) and/or horizontal shift quantity, etc. are respectively added, as header information, to respective main images obtained by simultaneously performing image pick-up operations by plural digital still cameras 81 (0, 0) . . . 81 (3, 2).

The data separation output unit 94 is means for separating header information from plural image files 82 (0, 0), 82 (0, 1), . . . , 82 (3, 2) which have been inputted at the image input unit 91 to output the header information thus obtained to the stereo information generating unit 75.

The stereo (adapter) information input unit 93 is means for inputting stereo information except for the contents included in inputted image files 82 (0, 0), 82 (0, 1), . . . , 82 (3, 2), e.g., at least parallel method/crossing method discrimination information indicating whether images of inputted respective image files 82 (0, 0), 82 (0, 1), . . . , 82 (3, 2) are either stereo images by the parallel method or stereo images by the crossing method.

The stereo information generating unit 95 is means for generating, on the basis of stereo information which has been inputted from the stereo (adapter) information input unit 93 and header information which have been outputted from the data separation output unit 94, stereo information to be outputted to the padding data generating unit 96 and the data multiplexing unit 101.

The stereo information encoding unit 96 is means for encoding stereo information which has been outputted from the stereo information generating unit 95 into an image such as one-dimensional bar code or two-dimensional bar code, etc. Moreover, parallel method/crossing method discrimination information in stereo information is transferred to the padding data generating unit 97 through the stereo information encoding unit 96.

The padding data generating unit 97 is means for generating padding data to be synthesized with plural main images for right eye and left eye on the basis of parallel method/crossing method discrimination information which has been outputted from the stereo information encoding unit 96 to output it to the image synthesis unit 98 along with encoded image of stereo information which has been outputted from the stereo information encoding unit 96.

The aspect ratio adjustment input unit 92 is means for inputting aspect adjustment ratio of synthetic image of stereo image and padding data which are to be outputted. This aspect adjustment ratio is inputted in conformity with, e.g., ratio between longitudinal size and lateral size of printing paper used.

The image synthesis unit 98 is means for synthesizing respective image data for right eye and left eye which have been inputted from the image input unit 91 and encoded image of stereo information and padding data which have been outputted from the padding data generating unit 97 to generate single synthetic image having aspect adjustment ratio which has been inputted from the aspect ratio adjustment input unit 92.

The image encoding unit 99 is means for compression-encoding synthetic image which has been obtained at the image synthesis unit 98 in accordance with a predetermined system, e.g., JPEG system, etc.

The data multiplexing unit 101 is means for multiplexing synthetic image which has been compression-encoded by the image encoding unit 98 and stereo information which has been outputted from the stereo information generating unit 95. Here, stereo information is added as header information of image file.

The recording medium writing unit 102 is means for writing image file which has been generated by the data multiplexing unit 101 into writable or rewritable non-volatile recording medium (e.g., EEPROM, etc.).

Then, the operation of the stereo image processing apparatus 500 will be explained.

Let consider the case where respective image files for plural eyes in which stereo information for stereoscopic display control, etc. such as discrimination information indicating stereo image, discrimination information of positions of view points (cameras), the number of horizontal view points (the number of images) and/or horizontal shift quantity, etc. are added as header information are respectively inputted as plural image files 82 (0, 0), 82 (0, 1), . . . , 82 (3, 2). In this case, before input of image file, parallel method/crossing method discrimination information indicating whether image file to be inputted from now on is either stereo image by the parallel method or stereo image by the crossing method is inputted from the stereo (adapter) information input unit 93 to set it at the stereo information generating unit 95. On the other hand, aspect adjustment ratio caused to be in conformity with ratio between size in longitudinal direction and size in lateral direction of a printing paper used is inputted from the aspect ratio adjustment input unit 92 to set it as aspect adjustment ratio of synthesis of image at the image synthesis unit 98.

After setting operations at the stereo information generating unit 95 and the image synthesis unit 98 are completed, plural image files 82 (0, 0), 82 (0, 1), . . . , 82 (3, 2) are inputted at the image input unit 91 to transfer main images at the respective image files 82 (0, 0), 82 (0, 1), . . . , 82 (3, 2) to the image synthesis unit 98, and to separate and extract header information at the data separation output unit 94 to output them to the stereo information generating unit 95.

When the stereo information generating unit 95 acquires header information of respective image files 82 (0, 0), 82 (0, 1), 82 (3, 2) from the data separation output unit 94, it generates stereo information to be outputted to the stereo information encoding unit 96 and the data multiplexing unit 101 from these header information and stereo information (at least parallel method/crossing method discrimination information) which has been already set by input from the stereo (adapter) information input unit 93 to output it to respective units.

Thereafter, at the stereo information encoding unit 96, stereo information which has been outputted from the stereo information generating unit 95 is encoded into an image such as one-dimensional bar code or two-dimensional bar code, etc. The encoded image of the stereo information is outputted to the padding data generating unit 97 along with parallel method/crossing method discrimination information in stereo image which has been outputted from the stereo information padding unit 95.

Then, at the padding data generating unit 97, generation of padding data corresponding to the parallel method/crossing method discrimination information which has been outputted from the stereo information generating unit 96 is performed. The padding data thus generated is outputted to the image synthesis unit 98 along with encoded image of stereo information which has been outputted from the stereo information encoding unit 96.

Then, at the image synthesis unit 98, plural main images which have been transferred from the image input unit 91 and padding data and encoded image of stereo information from the padding data generating unit 97 are synthesized so that single synthetic image data having aspect adjustment ratio which has been set by input from the aspect ratio adjustment input unit 92 is generated.

Figure 14:
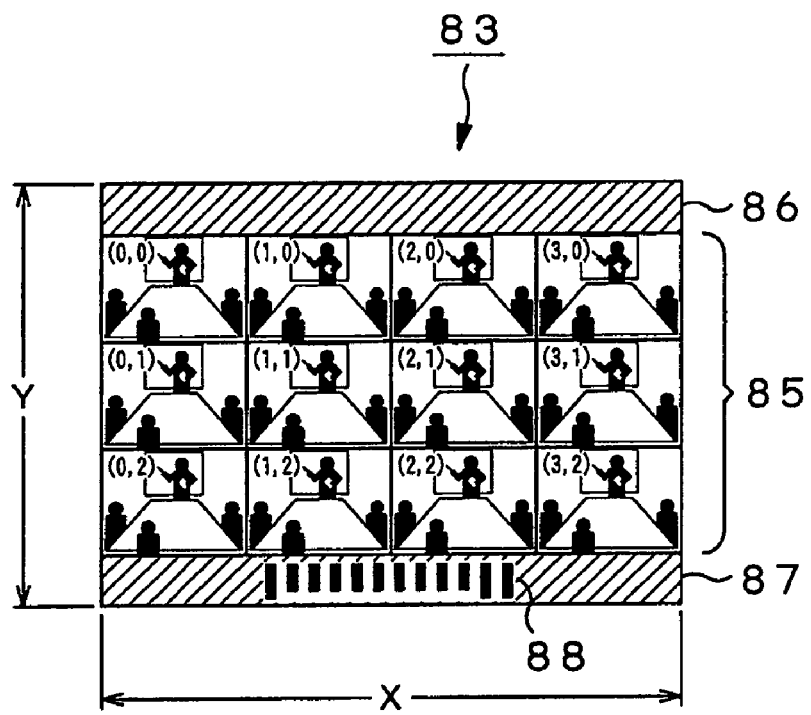
FIG. 14 is a view showing an example of synthetic image in the case where image generated at the stereo image processing apparatus shown in FIG. 13 is stereo image by the parallel method.
Figure 15:
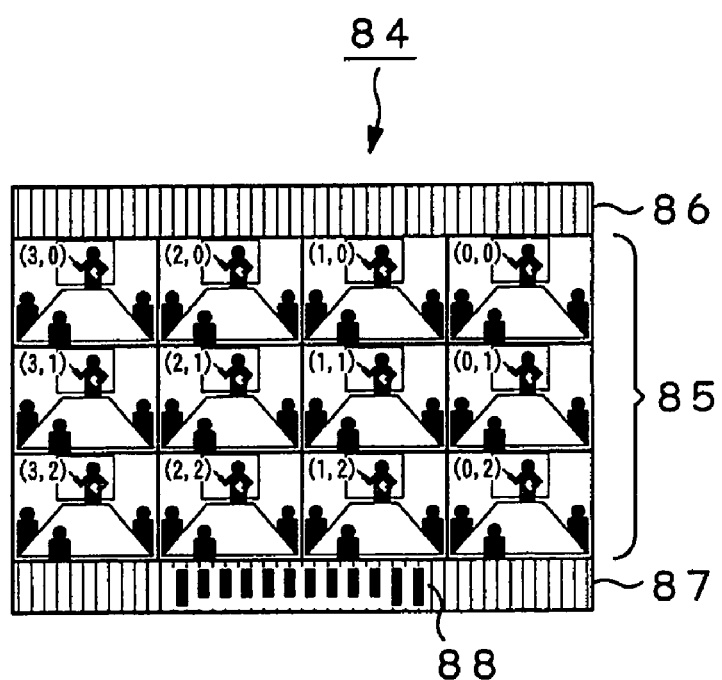
FIG. 15 is a view showing an example of synthetic image in the case where image generated by the stereo image processing apparatus shown in FIG. 13 is stereo image by the crossing method.

FIGS. 14 and 15 show examples of synthetic images 83, 84 which have been generated by the image synthesis unit 98, wherein FIG. 14 shows synthetic image 83 in the case where respective main images 85 (0, 0), 85 (0, 1), . . . , 85 (3, 2) are stereo images by the parallel method and FIG. 15 shows synthetic image 84 in the case where respective main images 85 (0, 0), 85 (0, 1), . . . , 85 (3, 2) are stereo images by the crossing method. In a manner as stated above, in the parallel method and the crossing method, arrangement orders in a horizontal direction of the respective main images 85 (0, 0), 85 (0, 1), . . . , 85 (3, 2) are opposite to each other. It should be noted that the positional relationships in upper and lower directions are the same.

In this example, padding data 86, 87 are arranged at the upper and lower portions of respective main images 85 (0, 0), 85 (0, 1), . . . , 85 (3, 2). The respective main images 85 (0, 0), 85 (0, 1), . . . , 85 (3, 2) are arranged in the integrated state so that ends in horizontal direction and ends in vertical direction are in contact with each other. The longitudinal and lateral sizes of the synthetic images 83, 84 are determined in accordance with aspect adjustment ratio which has been inputted from the aspect ratio adjustment input unit 92. In concrete terms, in FIG. 14, length of long side (the length in horizontal direction in this example) of the integrated main image 85 is caused to be lateral length X of the synthetic image 83 to further determine lateral length Y of synthetic image 83 from the lateral length X of the synthetic image 83 and the aspect adjustment ratio. Namely, the image synthesis unit 98 variably adjusts size of padding data so that longitudinal and lateral sizes of the synthetic image 83 have aspect adjustment ratio designated in advance to synthesize the padding data thus obtained with the integrated main image 85.

The positions in the vertical direction of the integrated main images 85 in the synthetic image 83 or 84 are caused to be peculiar to the system. In this example, determination is made such that the integrated main image 85 is arranged substantially at intermediate position in the vertical direction. Accordingly, in this example, in the synthetic images 83, 84, areas of padding data 86, 87 are ensured at upper and lower portions of the integrated main image 85. It should be noted that arrangement in which areas of padding data 86, 87 are ensured at upper and lower portions of the integrated main image 85 in this way is only one example. An area of padding data may be ensured only at one of upper and lower portions of the integrated main image 85.

Moreover, in this example, one-dimensional bar code which is encoded image 88 of stereo information is arranged in the area of the padding data 87 at the lower portion of the synthetic image 83 or 84. It is a matter of course that the encoded image 88 of the stereo information may be disposed in the padding data 86 of the upper area, or encoded images are respectively disposed at upper and lower portions thereof. Further, plural encoded images 88 of stereo information may be disposed in the area of one padding data 86 or 87.

The synthetic image data obtained by the image synthesis unit 98 as described above is compression-encoded in accordance with a predetermined system, e.g., JPEG system, etc. by the image encoding unit 99, and is sent to the data multiplexing unit 101, at which the compression-encoded synthetic image and header information including the content of stereo information from the stereo information generating unit 95 are multiplexed. Thus, file of the stereo image is prepared. The file of the prepared stereo image is recorded into the recording medium by the recording medium writing unit 102.

As stated above, in accordance with the stereo image processing apparatus 500 of this embodiment, it is possible to prepare a file of stereo image in which stereo information and parallel method/crossing method discrimination information are added to synthetic image. Thus, it is possible to perform stereoscopic reproduction of image without depending upon header information of file of stereo image. Further, there is employed an approach to read thereinto, from stereo image sheet which is printed matter of synthetic image, its synthetic image by means of scanner to decode encoded image of stereo information and padding data which exist therein, thereby making it possible to perform stereoscopic reproduction of image. In addition, since stereo information and parallel method/crossing method discrimination information are added to synthetic image, even if header information of file of stereo image is broken or missing, it is possible to recover or restore header information from encoded image of stereo information added to synthetic image.

Moreover, in observing, by naked eyes, stereo images stored at files of stereo images, a reproducing equipment capable of decoding compression-encoded synthetic image of stereo image file is caused to read thereinto files of stereo images through network or detachable recording medium, etc. Thus, as shown in FIG. 14 or FIG. 15, synthetic image 83 or synthetic image 84 of plural main images 85 and padding data 86, 87 is reproduced. In this instance, an observer can discriminate, at a glance, from visual features such as color and/or pattern, etc. of padding data 86, 87 displayed, whether plural main images 85 are stereo images by the parallel method or stereo images by the crossing method. Accordingly, it is possible to immediately attempt or perform stereoscopic observation by a suitable observation method to exclude excess burden of the observer.

Further, since aspect ratio of synthetic image of main images and padding data which have been recorded into the recording medium is determined in conformity with ratio between longitudinal size and lateral size of a printing paper used, it is possible to print the synthetic image so that its entirety is just filled within the printing paper. Further, an observer can discriminate, at a glance, from visual features of padding data area on stereo image sheet which is the result in which the entirety of synthetic image is printed on the printing paper, whether it is sufficient to observe, by the crossing method, stereo images on the stereo image sheet, or it is sufficient to observe them by the parallel method.

It should be noted that it is not necessary in an embodiment of the present invention that padding data is caused to have meaning of parallel method/crossing method discrimination information. Namely, there may be also employed a configuration in which padding data is caused to have an object to only embed empty areas formed in the case where respective main images for right eye and left eye are arranged in line in left and right directions within two-dimensional space having a predetermined aspect adjustment ratio so that encoded images of stereo information are arranged within the area of the padding data.

Functions for stereo image processing of the stereo image processing apparatuses 100, 400, 500 shown in the above-described embodiments and/or functions for stereo image reproduction of stereo image reproducing apparatuses 200, 300 may be provided as a program for allowing the computer to function.

It is to be noted that while the present invention has been described in accordance with certain preferred embodiments thereof illustrated in the accompanying drawings and described in detail, it should be understood by those ordinarily skilled in the art that the invention is not limited to the embodiments, but various modifications, alternative constructions or equivalents can be implemented without departing from the scope and spirit of the present invention as set forth by appended claims.

The invention claimed is:
1. A stereo image processing apparatus comprising:
   image input unit for inputting, as main images, plural images constituting stereo images;
   encoding circuitry for encoding stereoscopic display information with respect to the plural main images which have been inputted by the image input unit into an image; and
   image synthesis unit for synthesizing the plural main images which have been inputted by the image input unit and an encoded image which has been obtained by the encoding circuitry, wherein the image synthesis unit synthesizes padding data as the encoded image indicating whether the plural main images are either stereo images generated by a parallel method or stereo images generated by a crossing method with the plural main images, and further comprising:
   an aspect ratio adjustment unit applying aspect ratio adjustment control,
   wherein the image synthesis unit changes size of the padding data so that longitudinal and lateral sizes of a synthetic image have an aspect adjustment ratio adjustment that is determined by the aspect ratio adjustment unit and which is also applied to the image data.

2. The stereo image processing apparatus according to claim 1,
   wherein the encoded image is bar code.

3. The stereo image processing apparatus according to claim 1, further comprising:
   an encoding unit for compression-encoding an image which has been synthesized by the image synthesis means; and
   multiplexing unit for adding, as header information, stereo information for stereoscopic display control to the synthetic image which has been compression-encoded by the encoding means to prepare a file.

4. The stereo image processing apparatus according to claim 1,
   wherein the plural main images which have been inputted by the image input unit are images for right eye and left eye.

5. The stereo image processing apparatus according to claim 1,
   wherein the plural main images which have been inputted by the image input unit are images obtained by capturing one object from plural view points.

6. A stereo image processing method that is automatically executed by an electronic system controlled by a microprocessor comprising:
   inputting, as main images, plural images constituting stereo images by image input unit;
   encoding, stereo information for stereoscopic display control with respect to the plural main images which have been inputted by the image input unit into an image; and
   synthesizing, by image an synthesis unit, the plural main images which have been inputted by the image input unit and an encoded image which has been obtained by the encoding unit in the state where corresponding areas for respective images are partitioned, wherein the image synthesis unit synthesizes padding data as the encoded image indicating whether the plural main images are either stereo images generated by a parallel method or stereo images generated by a crossing method with the plural main images, and further comprising:

an aspect ratio adjustment unit applying aspect ratio adjustment control, wherein the image synthesis unit changes size of the padding data so that longitudinal and lateral sizes of a synthetic image have an aspect adjustment ratio adjustment that is determined by the aspect ratio adjustment unit and which is also applied to the image data.

7. A computer readable stereo image processing program that is stored in a machine readable electronic memory that is executed by a microprocessor controlled system and performs automatic operations when executed by the microprocessor including:

image input unit for inputting, as main images, plural images constituting stereo images;

an encoding unit for encoding stereo information for stereoscopic display control with respect to the plural main images which have been inputted by the image input unit; and an image synthesis unit for synthesizing the plural main images which have been inputted by the image input unit and an encoded image which has been obtained by the encoding unit and wherein the image synthesis unit synthesizes padding data as the encoded image indicating whether the plural main images are either stereo images generated by a parallel method or stereo images generated by a crossing method with the plural main images, and further comprising:

an aspect ratio adjustment unit applying aspect ratio adjustment control, wherein the image synthesis unit changes size of the padding data so that longitudinal and lateral sizes of a synthetic image have an aspect adjustment ratio adjustment that is determined by the aspect ratio adjustment unit and which is also applied to the image data.

* * * * *